W. Compton,
Bridle.
No. 92,425.                         Patented July 13, 1869.
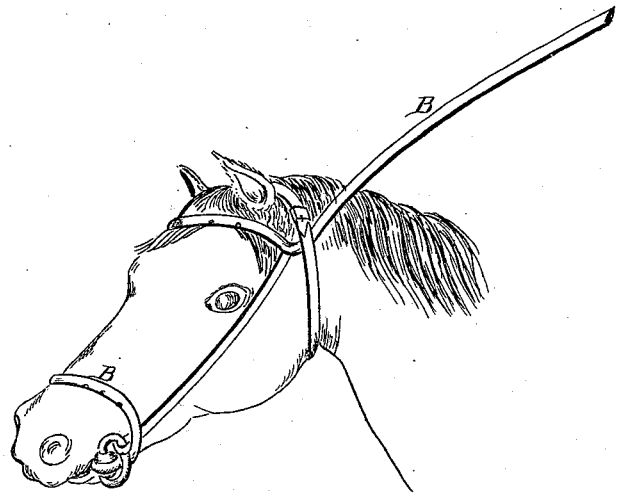
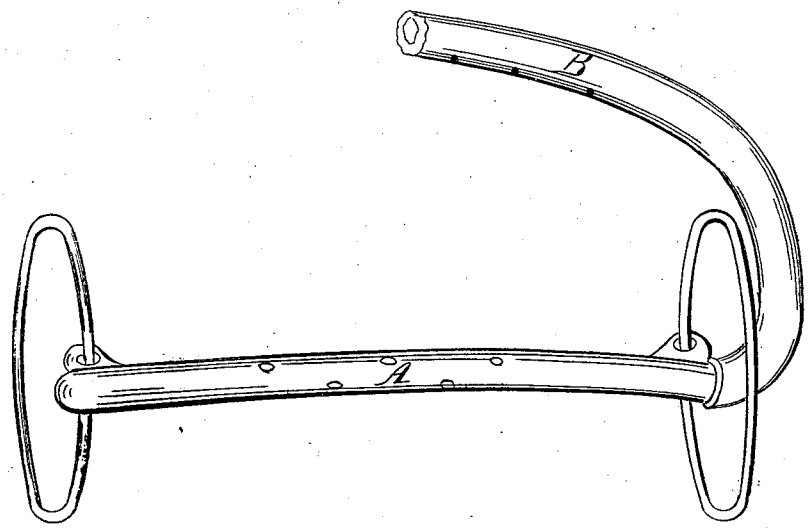
W. M. Gooding
Edward Collver } attest
Wm Compton

WILLIAM COMPTON, OF NEWARK, NEW JERSEY.

Letters Patent No. 92,425, dated July 13, 1869.

---

IMPROVED MEANS FOR REFRESHING HORSES WHILE IN HARNESS.

---

The Schedule referred to in these Letters Patent and making part of the same.

---

*To all whom it may concern:*

Be it known that I, WILLIAM COMPTON, of the city of Newark, county of Essex, and State of New Jersey, have made a new and useful invention in Means for Refreshing Horses while Working in Harness; and I do declare the following, when taken in connection with the accompanying drawings, to be a full, exact, and plain description thereof.

The nature of my invention relates to the application of water to the needs of laboring horses, while in their harness, in actual service; and It consists in the employment of a tubular bit, having perforations for the exit of water in fine jets, and in connecting such a bit, or any bit, with a flexible tube, supplied with water from a fount or source of supply, which may be placed in any appropriate and convenient place in the carriage or vehicle.

It consists, also, in certain details of construction, hereinafter mentioned, the better to effect the object in view.

A manner of accomplishing the humane object is shown in the drawings.

A hollow bit, A, preferably of wrought or malleable iron, having small perforations, *a a*, into its interior, is used for the mouth of the horse.

At one end of the bit is attached, by screw-nut or otherwise, the flexible tube B, which can be made to pass any part of the horse's body, if occasion requires.

It is shown, in Figure 1, as passing the ring of the bit, and crossing the nose of the horse above the nostrils, then passing up on the side of the head, (not seen in the drawings,) again crossing the head of the horse in front, just below the ears, and from thence is of sufficient length to be attached, in any manner easily detachable, to a small reservoir of water, located at an elevation higher than the horse's head, in or on a street-car, or any other vehicle, with a stop-cock, anywhere convenient for the hand of the driver, or if, the reservoir be below the head of the horse, it can be an India-rubber or other bag, or a bellows, and the water be forced through the tube by the foot of the rider or driver.

Perforations can be made, as shown, in the tube, from which to trickle the water upon the skin over the jugular vein in the neck, than which nothing better can be done when the blood is heated by extra exertion in cool weather, or when it is made too warm by ordinary labor in hot days of the summer-months.

Perforations can also be made, as shown, where the tube passes over the nose of the horse, from which water will trickle to the nostrils, cleaning them from dust, and cooling them refreshingly.

But the main use and benefit are from the water ejected from the hollow bit into the mouth, freeing it from saliva and dust, the water entering the throat in such small amounts as not to risk any injury to the horse, and yet to keep him refreshed and in working order, preventing the danger of a sunstroke, from the overheated state of the animal's blood.

By reason of having the bit made hollow or tubular, as described, it is also, as a consequence, stronger, and will bear more strain than the ordinary solid cast-iron ones.

By the use of a flexible tube, the horse is not constrained in his movements of the neck and head, nor is there any appreciable weight to be borne by the horse, either of the tube or the very small quantity of water at any time contained in it, the reservoir always being carried in the vehicle to which he may be attached.

By this arrangement the reservoir may be as large as desired, and may be kept covered and screened from the sun, which would not be so practicable, if the entire supply were carried on the back or neck of the horse. If carried by the horse, the weight would be more or less burdensome, and to that extent add to his labor and annoyance.

Moreover, by having the reservoir in or on the vehicle, or within reach of the driver, he can, with entire convenience, let on or stop off the supply to the tube, as may be found best for the horse.

When the reservoir is located higher than the horse's head, its own gravity affords sufficient pressure for its discharge through the outlets; when located below his head, pressure of some sort must be artificially applied.

A stop-cock may be applied near the junction of the tube with the bit, so as to cut off the supply to the bit, whilst retaining it for the tube.

Sliding caps or valves, of any ordinary construction, may also be applied to the orifices in the tube, so as to close them, and thus discharge only from the orifices in the bit.

This tube may be attached to any part of the harness, or to any ordinary bit, but it would not then be so efficient for refreshing the mouth and throat.

I claim a hollow perforated bit, combined with a flexible tube, for conveying water to the bit, substantially as set forth.

I also claim the flexible tube, having perforations in its side, combined with a bridle-bit, or other portion of the harness, substantially as and for the purpose set forth.

WM. COMPTON.

Witnesses:
WM. M. GOODING,
EDWARD COLLVER.